No. 649,241. Patented May 8, 1900.
W. GRUBE.
THEFT PREVENTING APPARATUS FOR BICYCLES.
(Application filed Aug. 19, 1899.)
(No Model.) 2 Sheets—Sheet 1.
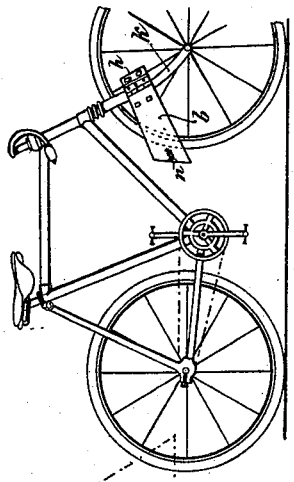
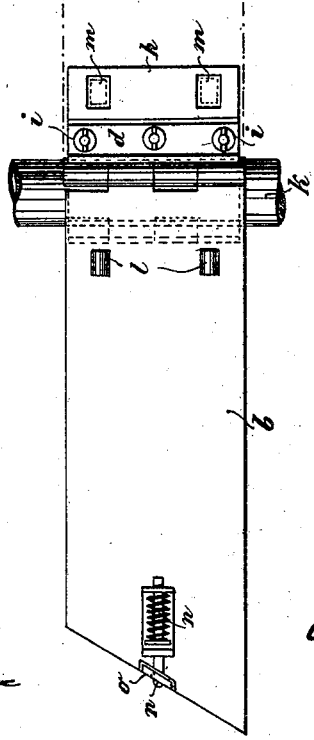
Witnesses
Clarence E. Achuly,
Frank S. Ober
Inventor
Walter Grube
by Wm A Rosenbaum
his atty.
THE NORRIS PETERS CO., PHOTO-LITHO., WASHINGTON, D. C.

No. 649,241. Patented May 8, 1900.
W. GRUBE.
THEFT PREVENTING APPARATUS FOR BICYCLES.
(Application filed Aug. 19, 1899.)
(No Model.) 2 Sheets—Sheet 2.

Witnesses
Clarence E. Ackerly
Frank S. Ober

Inventor
Walter Grube
by Wm A Rosenbaum
asso. atty.

UNITED STATES PATENT OFFICE.

WALTER GRUBE, OF HAMBURG, GERMANY.

THEFT-PREVENTING APPARATUS FOR BICYCLES.

SPECIFICATION forming part of Letters Patent No. 649,241, dated May 8, 1900.

Application filed August 19, 1899. Serial No. 727,768. (No model.)

*To all whom it may concern:*

Be it known that I, WALTER GRUBE, a citizen of the free city of Hamburg, residing at Hamburg, in the German Empire, have invented certain new and useful Improvements in Apparatus to be Applied to Bicycles and the Like to Prevent Theft of Same, (for which I have applied for patents in England, July 8, 1899; in Germany, July 1, 1899; in Austria, July 10, 1899; in Hungary, July 7, 1899; in France, July 8, 1899, and in Belgium, July 8, 1899,) of which the following is a specification.

This invention consists of an apparatus for preventing the theft of bicycles and the like.

An apparatus according to this invention which can be readily applied to any cycle comprises two plates which are normally closed upon each other and which when opened out display an inscription together with an explanatory notice to the public, so that the description thus displayed will betray any person making away with the cycle as a cycle thief, because he is not able to undo the fastening which keeps the plates in their open position, and thus he cannot replace the plates in their normal closed position, in which the inscription is not visible.

This invention may be carried out in various ways. One way of carrying it out is illustrated, by way of example, in the accompanying drawings, in which—

Figure 4:
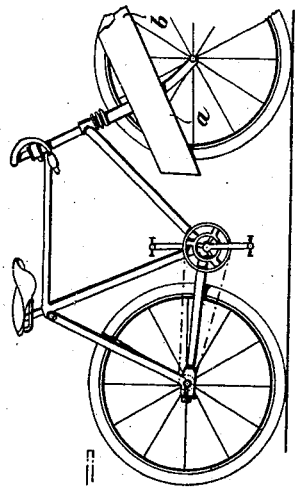
Figure 2:
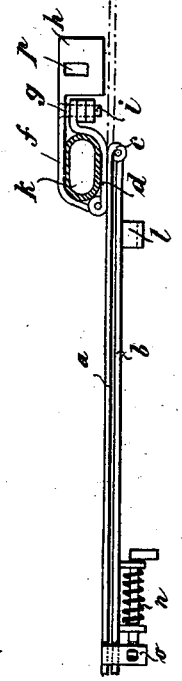

Figure 1 is a side elevation, and Fig. 2 a plan, of the theft-preventing apparatus in its closed position fixed to part of a cycle. Fig. 3 is a side elevation of a bicycle provided with the theft-preventing apparatus, which is shown closed. Fig. 4 is a side elevation of the bicycle, showing the apparatus opened to prevent theft.

As shown, the theft-preventing apparatus comprises two plates $a$ and $b$, connected together by means of a hinge $c$ or the like and hereinafter termed, respectively, the "fixed plate" and the "movable plate." The outer surfaces of these plates may, for the purpose of providing greater strength and giving a more elegant appearance to the same, be fluted, ribbed, or otherwise ornamented. For the purpose of fixing the apparatus to the bicycle the movable plate $a$ has attached to it a clip-piece or strap $d$, to which is hinged another clip-piece or strap $f$, provided with screw-threaded pins $g$, beyond which the strap $f$ has fixed to it a lock $h$. The pins $g$ of the strap $f$ are adapted to pass through slots or holes in the strap $d$, so that on screwing up the nuts $i$, which are preferably adapted to be operated solely by means of a box-spanner, the straps $d$ and $f$ are pressed toward each other, so as to clamp the whole apparatus firmly on the front fork $k$ or other convenient part of the frame of the bicycle. On the outer surface of the movable plate $b$ are provided hooked bolts $l$, which are adapted to engage in the sockets or apertures $m$ of the lock $h$ when the plate $b$ is opened out. Unintentional opening of the plates is prevented by any suitable device, conveniently by means of a spring-catch $n$, which engages with a part $o$ of the fixed plate $a$.

The lock $h$ may be of any suitable construction and can be opened by means of its proper key inserted through the keyhole $p$, which is situated in the top of the lock. The apparatus cannot be detached from the bicycle while it is in the locked position, because the plate $b$ in this position (shown in dotted lines in Fig. 2) covers the nuts $i$.

The mode of this apparatus is as follows: When the owner desires to use his bicycle, he closes the plates $a$ and $b$ onto each other, Figs. 2 and 3, and he secures them against unintentional opening by means of the spring-catch $n$. If he should now have to leave the bicycle unattended, he opens the catch $n$, turns the movable plate $b$ into the open position, (indicated in dotted lines in Figs. 1 and 2,) whereby the retaining-bolts $l$ are caused to engage in the lock $h$, so that now the inner surface of the plates $a$ and $b$, bearing the inscription, becomes visible. The plate $b$ can now be turned back only by opening the lock $h$ by means of its proper key. The inscription on the plates $a$ $b$ may vary in style. A suitable inscription would comprise the words "Stop thief," (or, in German, "Raddieb,") with the owner's name and address. Should the owner forget to turn back the plate $b$ into its closed position, he can always prove his ownership by producing the key of the lock $h$, while a cycle thief, on seeing the plate with the inscription displayed on the bicycle, will hesitate to steal the cycle for fear of immediate betrayal.

What I claim, and desire to secure by Letters Patent of the United States, is—

1. An apparatus for preventing the theft of bicycles, which consists of a pair of plates hinged together and normally folded together and means for fastening the apparatus to the bicycle, in combination with a lock arranged adjacent to the plates with which one of the plates is adapted to engage when it is swung open on its hinge, substantially as described.

2. An apparatus for preventing the theft of bicycles consisting of a pair of hinged plates, one of which is permanently attached to the bicycle by suitable fastening devices, said plates being normally folded together, in combination with a lock adapted to engage with the unattached plate when the latter is in its open position, said unattached plate being arranged also to cover the fastening devices, when in its open position and engaged by the lock, substantially as described.

In testimony whereof I have hereunto set my hand in the presence of two witnesses.

WALTER GRUBE.

Witnesses:
 GUSTAV WEBER,
 E. H. L. MUMMENHOFF.